United States Patent [19]

Mimura et al.

[11] Patent Number: 5,247,453
[45] Date of Patent: Sep. 21, 1993

[54] NUMERICAL CONTROL INFORMATION GENERATING APPARATUS

[75] Inventors: Naoki Mimura; Keiichi Ota, both of Niwa, Japan

[73] Assignee: Okuma Corporation, Aichi, Japan

[21] Appl. No.: 807,937

[22] Filed: Dec. 17, 1991

[30] Foreign Application Priority Data

Dec. 28, 1990 [JP] Japan .................. 2-419003

[51] Int. Cl.$^5$ ............................. G06F 15/46
[52] U.S. Cl. .................. 364/474.29; 364/474.11; 364/474.25
[58] Field of Search ............ 364/474.22–474.27, 364/474.29, 474.11, 191; 318/569, 570, 625, 592, 600

[56] References Cited

U.S. PATENT DOCUMENTS

| | | | |
|---|---|---|---|
| 4,692,856 | 9/1987 | Komiya | 364/474.11 |
| 4,788,636 | 11/1988 | Shiratori et al. | 364/191 |
| 4,814,999 | 3/1989 | Kawamura et al. | 364/474.11 |
| 4,853,867 | 8/1989 | Matsumura | 364/474.11 |
| 4,987,359 | 1/1991 | Saitoh | 364/474.11 |
| 5,084,660 | 1/1992 | Sasuki et al. | 364/474.11 |
| 5,088,361 | 2/1992 | Kojima et al. | 364/474.11 |
| 5,099,432 | 3/1992 | Fokaya et al. | 364/191 |
| 5,107,413 | 4/1992 | Fukaya et al. | 364/191 |
| 5,107,414 | 4/1992 | Fukaya et al. | 364/191 |
| 5,113,348 | 5/1992 | Tomita et al. | 364/191 |
| 5,150,303 | 9/1992 | Fukaya et al. | 364/474.22 |
| 5,184,294 | 2/1993 | Fukaya et al. | 364/191 |

*Primary Examiner*—Jerry Smith
*Assistant Examiner*—Jim Trammell
*Attorney, Agent, or Firm*—Wenderoth, Lind & Ponack

[57] ABSTRACT

A numerical control information generating apparatus generates numerical control information within a short period of time, since it extracts a machining portion from the input blank shape and the input machining shape and automatically divides the machining portion into first and second machining portions at the right point. The present apparatus controls a numerical control lathe with two headstocks, and includes: a divider for extracting a machining portion from an input blank shape as well as an input machining shape and for dividing the machining portion into an outer diameter machining portion which is to be machined by an outer diameter machining and an inner diameter machining portion which is to be machined by an inner diameter machining a determinator for determining divisional candidate positions which are positional candidates for respectively dividing the outer and inner diameter machining portions into a first machining portion to be machined by a first head stock and a second machining portion to be machined by a second headstock, and an automatic divider for selecting a divisional position from among the divisional candidate positions wherein a ratio of a cutting area of the first machining portion with respect to a cutting area of the second machining portion is selected to be closest to an output ratio of an output of a spindle motor of the first headstock with respect to an output of the spindle motor of the second headstock and for automatically respectively dividing the outer and inner diameter machining portions into the first machining portion and the second machining portion according to the divisional position.

4 Claims, 6 Drawing Sheets

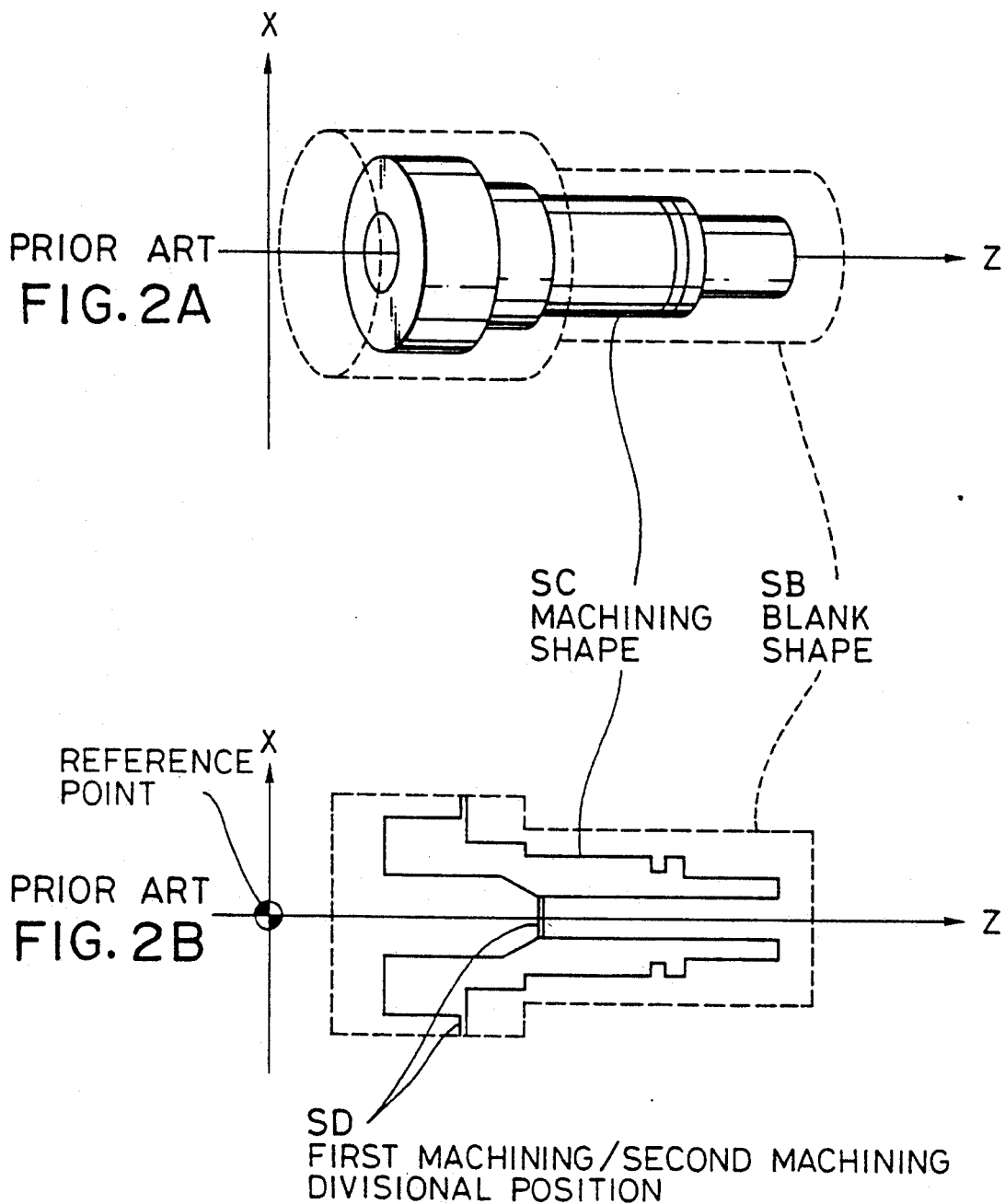

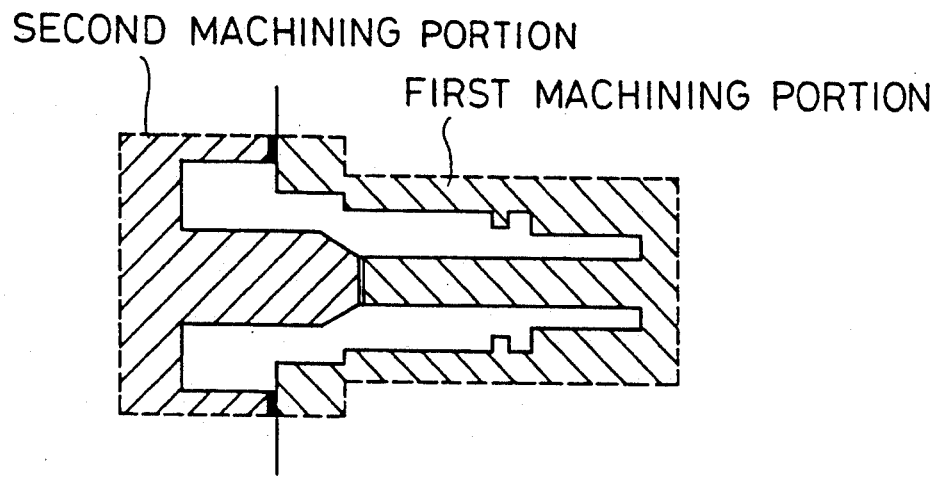
PRIOR ART
FIG. 3A
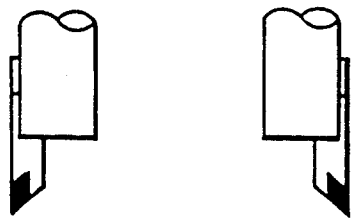
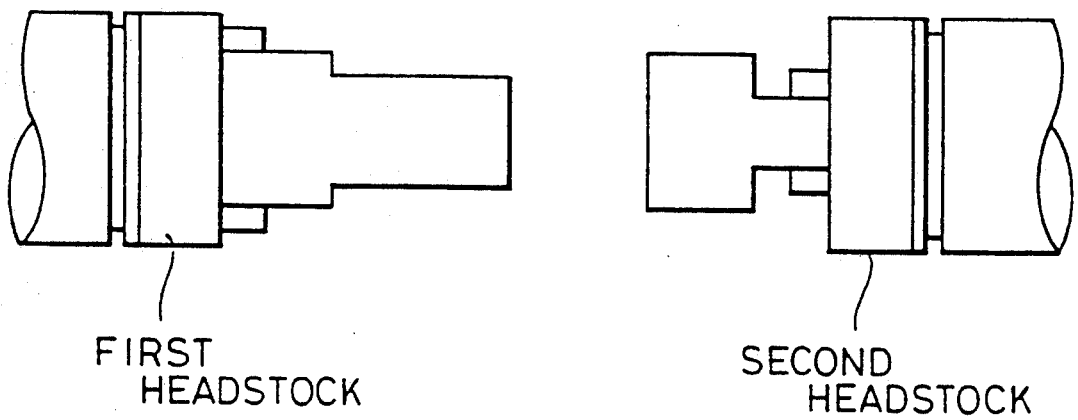
PRIOR ART
FIG. 3B

NUMERICAL CONTROL INFORMATION GENERATING APPARATUS

BACKGROUND OF THE INVENTION

The present invention relates to a numerical control information generating apparatus which generates numerical control information for controlling a numerical control lathe with two headstocks.

Recently, a numerical control lathe with a first headstock and a second headstock has been contrived, along with a numerical control information generating apparatus which generates numerical control information to machine a work using the numerical control lathe.

FIG. 1 is a block diagram showing an example of the prior art numerical control information generating apparatus. The input data SA which are input to a data input section 2 via a keyboard 1 by an operator are divided into three different types of data, that is, a blank shape SB, a machining shape SC and a first machining/second machining divisional position SD and are respectively stored in the blank shape storage section 3 and the machining shape storage section 4 and the first machining/second machining divisional position storage section 5. Both the blank shape SB stored in the blank shape storage section 3 and the machining shape SC stored in the machining shape storage section 4 are read into a machining portion extraction section 6 which extracts a maching portion SE and transmits the machining portion SE to a first machining/second machining portion dividing section 7.

By the first machining/second machining divisional position SD which is read into the first machining/second machining portion dividing section 7 from the first machining/second machining divisional position storage section 5, the machining portion SE read into the first machining/second machining portion dividing section 7 from the machining portion extraction section 6 is divided into both the first machining portion which the first headstock machines and the second machining portion which the second headstock machines and is consequently transmitted to a machining process determining section 8 as a divided machining portion SF. The divided machining portion SF which is read into the machining process determining section 8 from the first machining/second machining portion dividing section 7 is analyzed and a machining process which the first headstock provides to the first machining portion and also another machining process which the second headstock provides to the second machining portion are determined and then transmitted to a numerical control information generating section 9 as a machining process SG. The machining process SG transmitted from the machining process determining section 8 is read in the numerical control information generating section 9 and converted into numerical control information SH to be output in a mode such as a magnetic disk 10.

FIGS. 2A and 2B are drawings for explaining an example of dividing the machining portions in the above-mentioned prior art numerical control information generating apparatus. First, an operator stores the three different types of data, that is, the blank shape SB, the machining shape SC and the first machining/second machining divisional position SD respectively in the blank storage section 3, the machining shape storage section 4 and the first machining/second machining divisional position storage section 5 through the keyboard 1 and the data input section 2. Then, the machining portion extraction section 6 extracts a portion to be machined from the blank shape SB stored at the blank shape storage section 3 and the machining shape SC stored at the machining shape storage section 4 and transmits the extracted portion to the first machining/second machining portion dividing section 7 as the machining portion SE. Then, the first machining/second machining portion dividing section 7, wherein the machining portion SE is read, divides the machining portion SE into the first machining portion and the second machining portion according to the first machining/second machining divisional position SD which is stored at the first machining/second machining divisional position storage section 5. The first machining portion and the second machining portion, as divided and shown in FIG. 3A, are respectively provided with the first machining by the first headstock and the second machining by the second headstock as shown in FIG. 3B.

In the case of the above described prior art numerical control information generating apparatus, the operator in advance determines a divisional position for dividing a single machining portion into the first machining portion and the second machining portion. However, in the case of the numerical control lathe where an output of the spindle motor of the first headstock differs from that of the second headstock, there is admittedly a problem in that the operator is not able to allocate a divisional position for dividing a single machining portion into a portion to be machined by the first machining and another portion to be machined by the second machining at a suitable position unless he/she is the skilled in machining, since it must divide a single machining portion into the first machining portion and the second machining portion in order to equalize the machining time of a headstock with that of another headstock.

SUMMARY OF THE INVENTION

The present invention is contrived under the above circumstances, and aims at providing a numerical control information generating apparatus which is capable of extracting a machining portion from the input blank shape and the input machining shape and also capable of generating a numerical control information of which the machining portion is automatically divided into the first machining portion and the second machining portion at the suitable position.

The present invention relates to a numerical control information generating apparatus which generates a numerical control information for controlling a numerical control lathe with two headstocks. The above object of the present invention is achieved by providing: a dividing means for extracting a machining portion from an input blank shape and an input machining shape and for dividing the machining portion into an outer diameter machining portion which is to be machined by an outer diameter machining and an inner diameter machining portion which is to be machined by an inner diameter machining; a determining means for determining divisional candidate positions which are positional candidates for respectively dividing the outer and inner diameter machining portions into a first machining portion to be machined by a first headstock and a second machining portion to be machined by a second headstock, and an automatic dividing means for selecting a divisional position from among said divisional candidate positions wherein a ratio of a cutting area of the first machining portion with respect a cutting area of the second machining portion is selected to be closest to an output ratio of an output of a spindle motor of the first headstock with respect to an output of the spindle motor of the second headstock and for automatically respectively dividing the outer and inner diameter machining portions into the first machining portion and the second machining portion according to said divisional position.

BRIEF DESCRIPTION OF THE DRAWINGS

In the accompanying drawings:

FIGS. 2A and 2B are drawings for explaining an example of dividing the machining portions in the prior art numerical control information generating apparatus;

FIGS. 3A and 3B are drawings for explaining an example of dividing the machining portions in the prior art numerical control information generating apparatus;

DESCRIPTION OF THE PREFERRED EMBODIMENT

Figure 1:
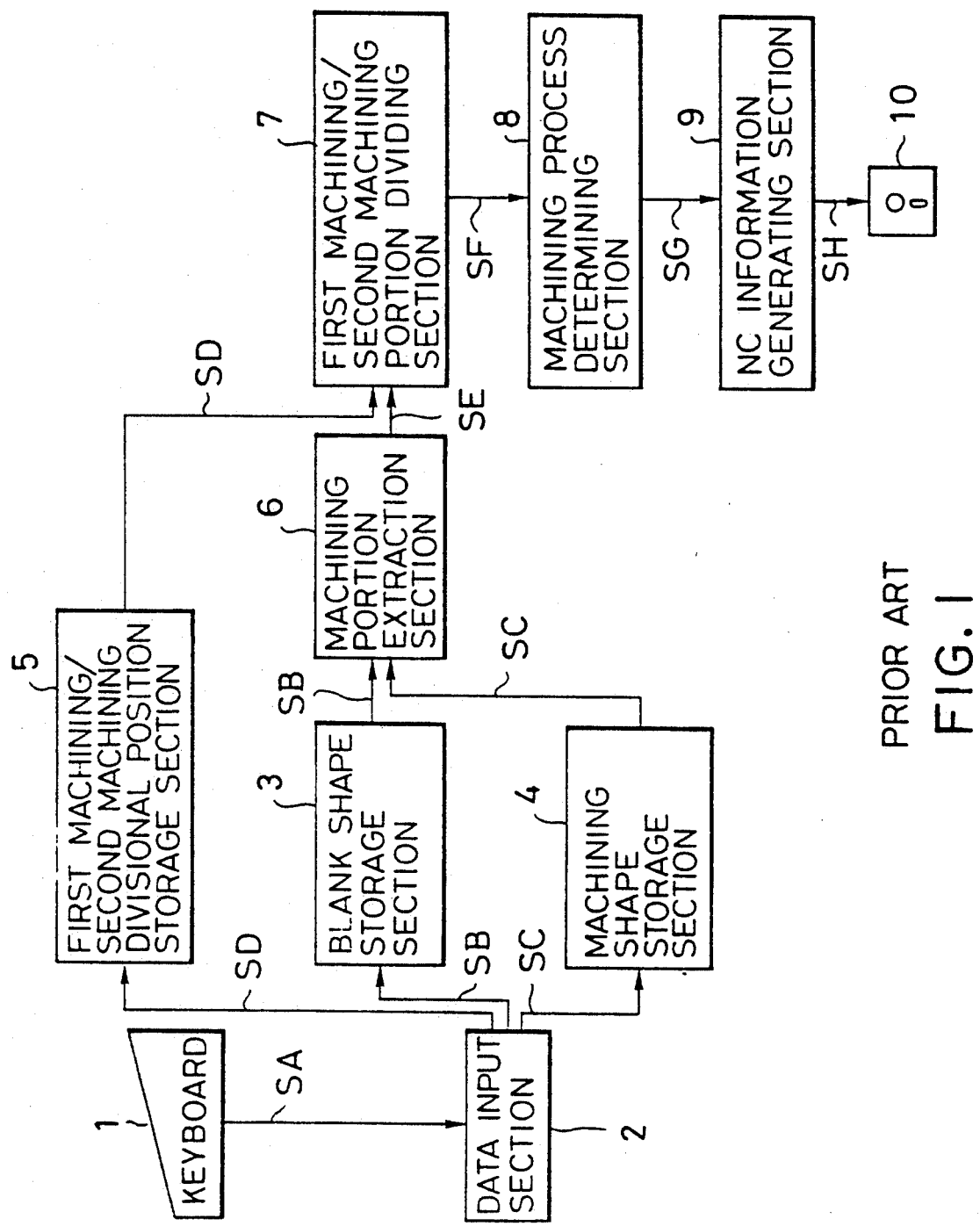
FIG. 1 is a block diagram showing an example of a prior art numerical control information generating apparatus.
Figure 4:
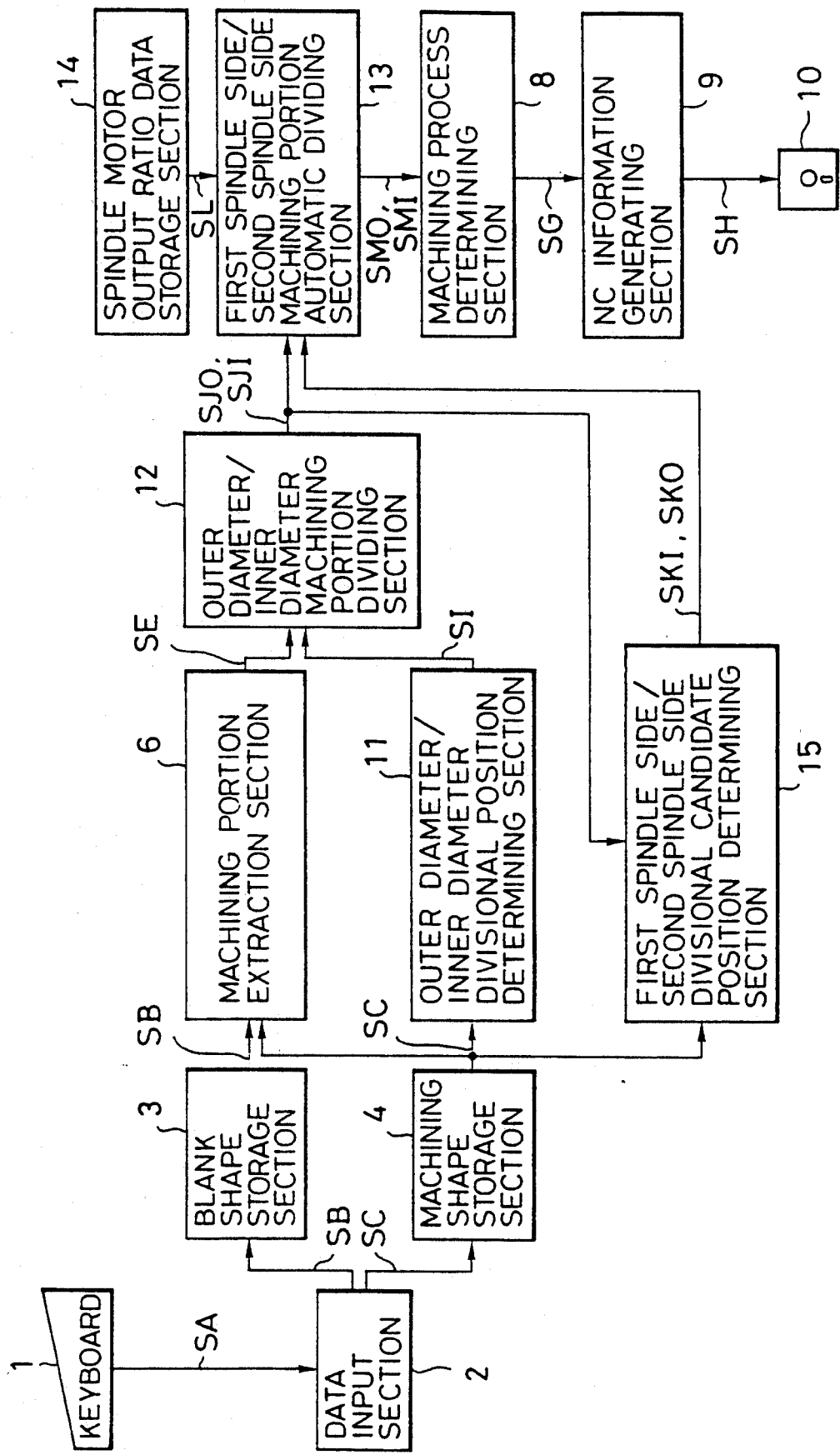
FIG. 4 is a block diagram showing an example of a numerical control information generating apparatus according to the present invention.

FIG. 4 is a block diagram showing an example of a numerical control information generating apparatus according to the present invention in correspondence with FIG. 1. Identical elements have been provided with identical numerals and detailed explanations thereof have been omitted. The numerical control information generating apparatus is newly furnished with an outer diameter/inner diameter divisional position determining section 11, an outer diameter/inner diameter machining portion dividing section 12, a first spindle side/second spindle side machining portion automatic dividing section 13, a spindle motor output ratio data storage section 14 and a first spindle side/second spindle side divisional candidate position determining section 15.

The machining shape SC stored in the machining shape storage section 4 is read and analyzed by the outer diameter/inner diameter divisional position determining section 11 and an outer diameter/inner diameter divisional position SI, which divides the machining shape SC into the outer diameter machining poriton requiring the outer diameter machining and the inner diameter machining portion requiring the inner diameter machining, is then generated and transmitted to the outer diameter/inner diameter dividing section 12. By the outer diameter/inner diameter divisional position SI which is read into the outer diameter/inner diameter machining portion dividing section 12 from the outer diameter/inner diameter divisional position determining section 11, the machining portion SE, which is read into the outer diameter/inner diameter machining portion dividing section 12 from the machining portion extraction section 6, is divided into two separate machining portions, namely, the outer diameter machining portion SJO and the inner diameter machining portion SJI. Then, these machining portions SJO and SJI are transmitted to the first spindle side/second spindle side machining portion automatic dividing section 13 and the first spindle/side second spindle side divisional candidate position determining section 15. Both the outer diameter machining portion SJO and the inner diameter machining portion SJI, which are read into the first spindle side/second spindle side divisional candidate position determining section 15 from the outer diameter/inner diameter machining portion dividing section 12, are analyzed together with the machining shape SC read into the first spindle side/second spindle side divisional candidate position determining section 15 from the machining shape storage section 4. As a result, the outer diameter machining first machining/second machining divisional candidate position SKO and the inner diameter machining first machining/second machining divisional candidate position SKI are determined as candidate positions for a division which serves for further dividing the outer diameter machining portion SJO and the inner diameter machining portion SJI respectively into the first machining portion and the second machining portion and are transmitted to the first spindle side/second spindle side machining portion automatic dividing section 13.

On the other hand, out of the outer diameter machining first machining/second machining divisional candidate position SKO and the inner diameter machining first machining/second machining divisional candidate position SKI which are read into the first spindle side/second spindle side machining portion automatic dividing section 13 from the first spindle side/second spindle side divisional candidate position determining section 15, both the outer diameter machining portion SJO and the inner diameter machining portion SJI which are read into the first spindle side/second spindle side machining portion automatic dividing section 13 from the outer diameter/inner diameter machining portion dividing section 12 are divided at the divisional point where the ratio of the cutting area of the first machining portion with respect to that of the second machining portion becomes closest to the spindle motor output ratio SL stored in the spindle motor output ratio data storage section 14. Then, these divided machining portions are respectively transmitted to the machining process determining section 8 as a divided outer diameter machining portion SMO and a divided inner diameter machining portion SMI.

Figure 5:
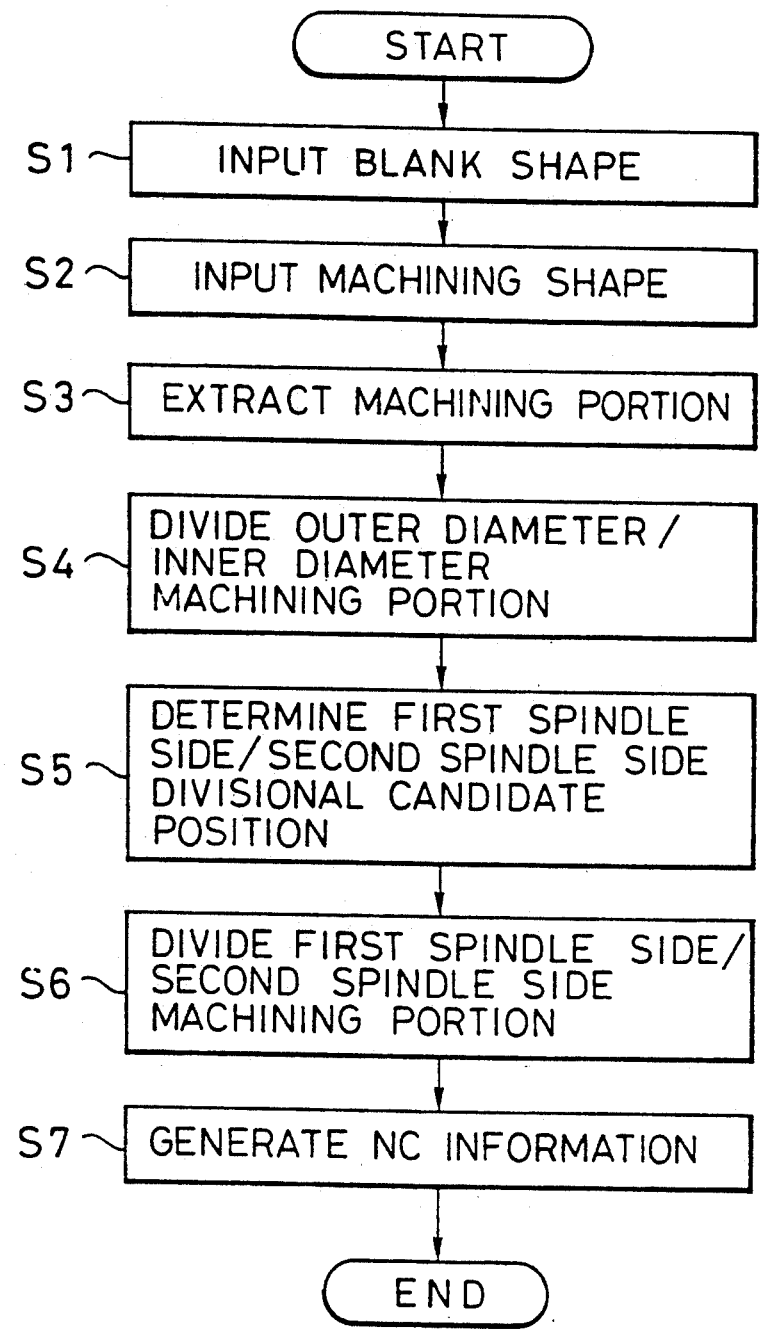
FIG. 5 is a flowchart showing an example of the operation of the numeral control information generating apparatus according to the present invention.
Figure 6A:
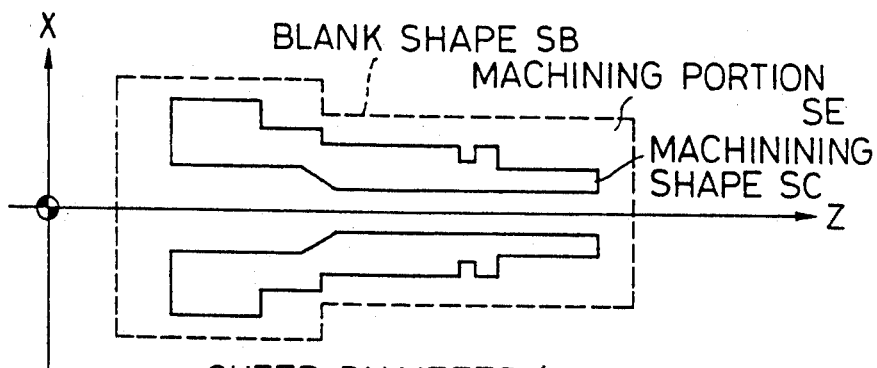
FIGS. 6A and 6d are drawings for explaining an example of dividing the machining portions in the numerical control information generating apparatus according to the present invention.
Figure 6B:
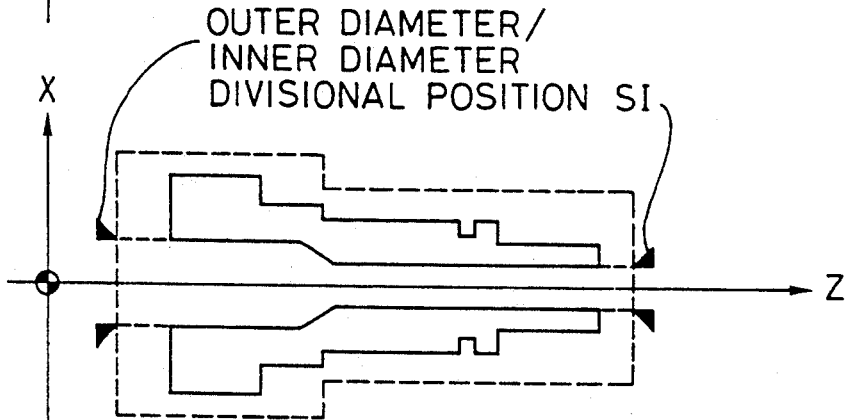

FIG. 5 is a flowchart showing an example of the operation of the numerical control information generating apparatus according to the present invention and the figure explains the case where the blank shape SB and the machining shape SC as shown in FIG. 6A are input. As a first step, an operator inputs the blank shape SB and the machining shape SC shown in FIG. 6A in the blank shape storage section 3 and the machining shape storage section 4 through the keyboard 1 and the data input section 2 (Steps S1 and S2). The machining portion extraction section 6 reads the blank shape SB stored at the blank shape storage section 3 and the machining shape SC stored at the machining shape storage section 4, extracts a machining portion SE as shown in FIG. 6A and transmits the machining portion SE to the outer diameter/inner diameter machining portion dividing section 12 (Step S3). In the meantime, the outer diameter/inner diameter divisional position determining section 11 reads the machining shape SC from the machining shape storage section 4 and determines the outer diameter/inner diameter divisional position SI for dividing the machining portion SE into the outer diameter machining portion and the inner diameter machining portion as shown in FIG. 6B. Then, the outer diameter/inner diameter machining portion dividing section 12 divides the machining portion SE into the outer diameter machining portion SJO and the inner diameter machining portion SJI according to the outer diameter/inner diameter divisional position SI. However, in this case, the outer diameter/inner diameter divisional position SI is singled out to be at the two points of the machining shape SC, that is, a point where the coordinate value of the Z-axis is the greatest and the coordinate position of the X-axis is the smallest and another point where the coordinate value of the Z-axis is the smallest and the coordinate position of the X-axis is the smallest (Step S4).

Figure 6C:
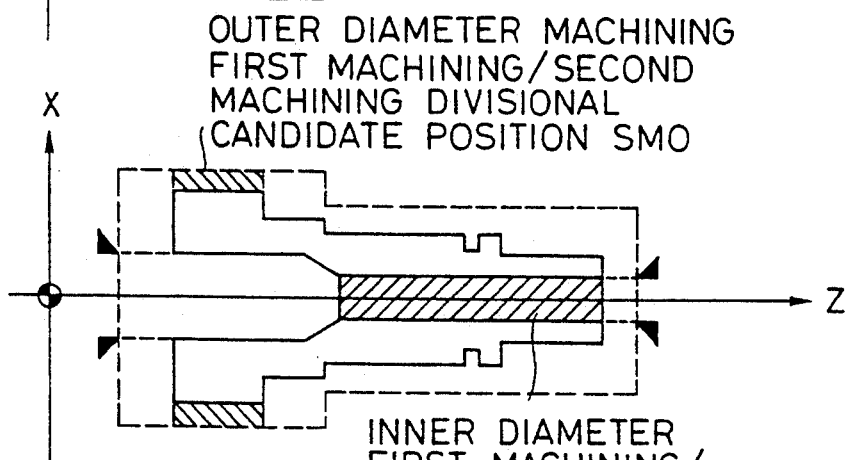

In addition, as shown in FIG. 6C, the first spindle side/second spindle divisional candidate position determining section 15 determines the outer diameter machining first machining/second machining divisional candidate position SKO and the inner diameter machining first machining/second machining divisional candidate position SKI as the candidates for the division which divides the outer diameter machining portion SJO and the inner diameter machining portion SJI which are read from the outer diameter/inner diameter machining portion dividing section 12 into the first machining portion and the second machining portion and then transmits them to the first spindle side/second spindle side machining portion automatic dividing section 13. In this case, while the outer diameter machining first machining/second machining divisional candidate position SKO is determined to be at all points of the outer diameter machining portion SJO where the coordinate value of the X-axis is the greatest, the inner diameter machining first machining/second machining divisional candidate position SKI is determined to be at all points of the inner diameter machining portion SJI where the coordinate value of the X-axis is the smallest (Step S5).

Figure 6D:
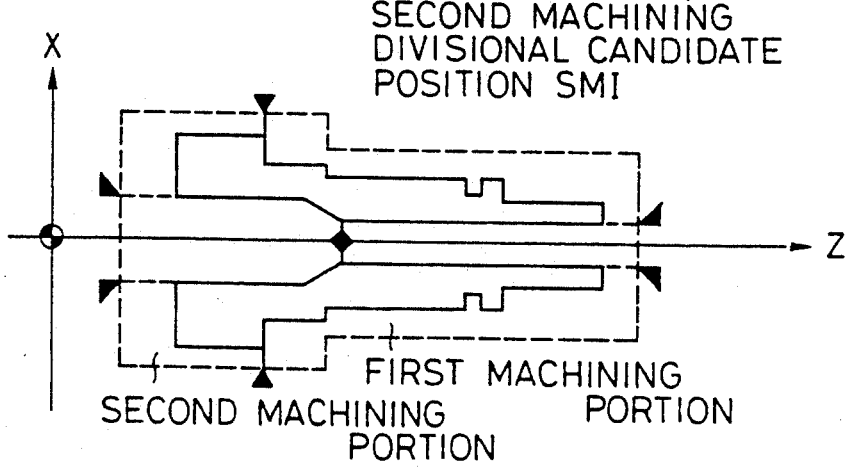

Out of the inner diameter machining first machining/second machining divisional candidate position SKI and the outer diameter machining first machining/second machining divisional candidate position SKO which are read from the first spindle side/second spindle side divisional candidate position determining section 15, the first spindle side/second spindle side machining portion automatic dividing section 13 selects the divisional position which can divide the machining portion at the value by which the ratio of the cutting area of the first machining portion to that of the second machining portion becomes closest to the output ratio of the spindle motor of the first headstock to that of the second headstock in case of dividing the outer diameter machining portion SJO and the inner diameter machining portion SJI which are read from the outer diameter/inner diameter machining portion dividing section 12 (refer to FIG. 6D). Then, the first spindle side/second spindle side machining portion automatic dividing section 13 divides the outer diameter machining portion SJO and the inner diameter machining portion SJI to form the divided outer diameter machining portion SMO and the divided inner diameter machining portion SMI (Step S6). Next, the machining process determining section 8 determines the machining process by the first headstock and that by the second headstock based on the divided outer diameter machining portion SMO and the divided inner diameter machining portion SMI and the numerical control information generating section 9 generates a numerical control information of the machining process (Step S7). This completes all processings.

As described above, it is possible to generates a practical numerical control information efficiently and precisely, since the numerical control information generating apparatus can divide a single machining portion into the first machining portion and the second machining portion at the right point.

What is claimed is:

1. A numerical control information generating apparatus for controlling a numerical control lathe having two headstocks, said apparatus comprising:
    a dividing means for extracting a machining portion from an input blank shape and an input machining shape and for dividing the machining portion into an outer diameter machining portion which is to be machined by an outer diameter machining and an inner diameter machining portion which is to be machined by an inner diameter machining;
    a determining means for determining divisional candidate positions which are positional candidates for respectively dividing the outer and inner diameter machining portions into a first machining portion to be machined by a first headstock and a second machining portion to be machined by a second headstock; and
    an automatic dividing means for selecting a divisional position from among the divisional candidate positions wherein a ratio of a cutting area of the first machining portion with respect to a cutting area of the second machining portion is selected to be closest to an output ratio of an output of a spindle motor of the first headstock with respect to an output of the spindle motor of the second headstock and for automatically respectively dividing the outer and inner diameter machining portions into the first machining portion and the second machining portion according to said divisional position.

2. A numerical control information generating apparatus as claimed in claim 1, wherein said dividing means comprises:
    a machining portion extraction means for extracting the machining portion based on the blank shape and the machining shape;
    an outer diameter/inner diameter divisional position determining means for obtaining an outer diameter/inner diameter divisional position based on the machining shape, and
    an outer diameter/inner diameter machining portion dividing means for obtaining an outer diameter machining portion and an inner diameter machining portion based the extracted machining portion and the obtained machining portions.

3. A numerical control information generating apparatus as claimed in claim 1, further comprising a machining process determining means for determining the machining step based on the first machining portion and the second machining portion.

4. A numerical control information generating apparatus as claimed in claim 3, further comprising a numerical control information generating means for generating the numerical control information based on the machining step determined by said machining process determining means.

* * * * *